US011028552B2

United States Patent
Auvinen et al.

(10) Patent No.: US 11,028,552 B2
(45) Date of Patent: Jun. 8, 2021

(54) ARRANGEMENT IN THE HOISTING APPARATUS OF A WORK MACHINE, HOISTING APPARATUS OF A WORK MACHINE, AND WORK MACHINE

(71) Applicant: PONSSE OYJ, Vieremä (FI)

(72) Inventors: Toni Auvinen, Vieremä (FI); Marko Halonen, Vieremä (FI)

(73) Assignee: PONSSE OYJ, Vieremä (FI)

( * ) Notice: Subject to any disclaimer, the term of this patent is extended or adjusted under 35 U.S.C. 154(b) by 186 days.

(21) Appl. No.: 16/095,546

(22) PCT Filed: Apr. 26, 2017

(86) PCT No.: PCT/FI2017/050314
§ 371 (c)(1),
(2) Date: Oct. 22, 2018

(87) PCT Pub. No.: WO2017/191357
PCT Pub. Date: Nov. 9, 2017

(65) Prior Publication Data
US 2019/0093309 A1 Mar. 28, 2019

(30) Foreign Application Priority Data

May 3, 2016 (FI) .................................... 20165380

(51) Int. Cl.
*E02F 3/36* (2006.01)
*A01G 23/08* (2006.01)
(Continued)

(52) U.S. Cl.
CPC .......... *E02F 3/3681* (2013.01); *A01G 23/003* (2013.01); *A01G 23/08* (2013.01);
(Continued)

(58) Field of Classification Search
CPC ..... E02F 3/3681; E02F 9/2275; E02F 3/3604; A01G 23/003; A01G 23/083; A01G 23/08; B66C 1/68; B66C 13/12; B66C 13/14
(Continued)

(56) References Cited

U.S. PATENT DOCUMENTS 3,301,587 A  1/1967  Heikkinen
4,382,624 A * 5/1983  Lysenko .................. B66C 3/005
                                                    294/119.4
(Continued)

FOREIGN PATENT DOCUMENTS

CN   103590934 A   2/2014
CN   204512024 U   7/2015
(Continued)

OTHER PUBLICATIONS

Office Action issued in Chinese Patent Application No. 201780027352.8 dated Jul. 23, 2019.
(Continued)

*Primary Examiner* — Kenneth Rinehart
*Assistant Examiner* — Patrick C Williams
(74) *Attorney, Agent, or Firm* — FisherBroyles, LLP; Robert Kinberg

(57) ABSTRACT

A hoisting apparatus includes a rotation device with connectors for connecting pressure-medium lines to a rotation device, a boom, from which the pressure-medium lines are arranged to lead to the rotation device, and a pivoted joint for suspending the rotation device on the boom. The pivoted joint includes two consecutive pivots in a longitudinal direction of the rotation device. The rotational axes of the pivots are at right-angles to each other. The pressure-medium lines are routed between lugs of the pivot on a boom side of the pivoted joint, past the connectors of the rotation
(Continued)

device in the longitudinal direction of the rotation device, to turn towards the connectors to form a hose loop and then routed to the connectors of the rotation device. The pressure-medium lines are arranged on both sides of the rotation device related to a plane defined in the longitudinal direction of the boom and the longitudinal direction of the rotation device.

17 Claims, 6 Drawing Sheets

(51) Int. Cl.
  *B66C 13/14* (2006.01)
  *E02F 9/22* (2006.01)
  *A01G 23/00* (2006.01)
  *B66C 1/68* (2006.01)
  *B66C 13/12* (2006.01)
  *A01G 23/083* (2006.01)

(52) U.S. Cl.
  CPC ............... *B66C 1/68* (2013.01); *B66C 13/12* (2013.01); *B66C 13/14* (2013.01); *E02F 3/3604* (2013.01); *E02F 9/2275* (2013.01); *A01G 23/083* (2013.01)

(58) Field of Classification Search
  USPC .......................................................... 137/580
  See application file for complete search history.

(56) References Cited

U.S. PATENT DOCUMENTS

| | | | | |
|---|---|---|---|---|
| 4,717,191 A | * | 1/1988 | Farmer | B66C 3/005 |
| | | | | 294/119.4 |
| 4,989,652 A | * | 2/1991 | Hansson | A01G 23/08 |
| | | | | 144/34.1 |
| 5,129,438 A | * | 7/1992 | Hamilton | A01G 23/081 |
| | | | | 144/24.13 |
| 5,908,060 A | | 6/1999 | Fargeot | |
| 7,311,489 B2 | * | 12/2007 | Ekman | E02F 3/3681 |
| | | | | 414/723 |
| 2013/0256468 A1 | * | 10/2013 | Han | F16L 3/01 |
| | | | | 248/56 |

FOREIGN PATENT DOCUMENTS

| | | |
|---|---|---|
| EP | 1889808 A1 | 2/2008 |
| EP | 2077356 A1 | 7/2009 |
| EP | 1448471 B1 | 1/2011 |
| EP | 2787128 A1 | 10/2014 |
| EP | 2824059 A1 | 1/2015 |
| EP | 3009391 A1 | 4/2016 |
| SU | 138724 A1 | 11/1960 |
| WO | 2014129954 A1 | 8/2014 |

OTHER PUBLICATIONS

International Search Report for PCT/FI2017/050314 dated Aug. 23, 2017.
Written Opinion for PCT/FI2017/050314 dated Aug. 23, 2017.
Extended European Search Report in related European Patent Application No. 17792554.2, dated Dec. 16, 2019, 5 pages.
Russian Search Report in corresponding Russian Patent Application No. 2018142306, dated Jun. 22, 2020, 11 pages with English Translation.

* cited by examiner

Section III–III  Fig. 4

ARRANGEMENT IN THE HOISTING APPARATUS OF A WORK MACHINE, HOISTING APPARATUS OF A WORK MACHINE, AND WORK MACHINE

CROSS-REFERENCE TO RELATED APPLICATIONS

This application is a U.S. National Stage Application of International Patent Application No. PCT/FI2017/050314, filed Apr. 26, 2017, which claims benefit of Finland Patent Application No. 20165380, filed May 3, 2016.

TECHNICAL FIELD

The invention relates to an arrangement in the hoisting apparatus of a work machine, which hoisting apparatus includes
- a rotation device equipped with connectors for connecting pressure-medium lines to the rotation device,
- a boom, from which the pressure-medium lines are arranged to be led to the rotation device,
- a pivoted joint for suspending the rotation device on the boom, which pivoted joint includes two consecutive pivots in the longitudinal direction of the rotation device, the rotational axes of which pivots are arranged at right-angles to each other, and in which the pressure-medium lines are arranged to route between the lugs of the pivot on the boom side of the pivoted joint. The invention also relates to the hoisting apparatus of a work machine, and a work machine, and preferably a forest machine.

BACKGROUND OF THE INVENTION

A forest machine typically includes a hoisting apparatus comprising a set of booms, a pivoted joint, and a rotation device. A tool, such as, for example, a grab or clamp for processing trees, or correspondingly some other tool for handling other loads, can be attached to the rotation device. The pivoted joint is between the rotation device and the end of the set of booms and it most usually includes two consecutive pivots. The rotational axes of the pivots are usually at right-angles to each other. The task of the pivoted joint, the piece of which between the pivots is often called a hanger, is to permit objects attached to it to rotate freely relative to the two axes of rotation. Solutions are also known, in which it is specifically desired to damp the free rotation, or to brake it, using a so-called hanger brake in a manner that is, as such, known. The said hanger brake can be arranged on one or more axes of rotation. The task of the rotation device, which is often called a rotator, is to turn the tool that is attached to it to a suitable attitude at any time.

The operating power of the rotation device and the tool attached to it is created using a pressurized medium. For this purpose pressure-medium lines are routed from the boom to the rotation device. Usually the lines include input and return lines. Various ways of routing the pressure-medium lines from the boom of the hoisting apparatus of the work machine to the connections arranged for them in the rotation device are known from the prior art. Some examples of these are European patent publications FP1448471 and EP1889808 and European patent application publication EP2824059.

A solution is known from publication EP1448411, in which the pressure-medium lines formed of hoses are led from the end of the boom of the hoist, through a hanger, to the upper end of the rotation device. The hoses then run through the hanger through at least one pivoted joint, in which there is a cut pivot pin. It is also possible for the hoses to travel through both pivoted joints of the hanger. The hoses are connected to the upper cover of the rotation device, in which the connectors are set parallel to the axis of rotation of the rotation device. The connectors then face straight upwards towards the hanger. A drawback of this solution is the placing of the connectors of the hoses close to the pivoted joint and the axis of rotation. The swinging of the rotator and the tool in it causes movement and thus stresses in the hose and joint. This reduces the durability of the joints and hoses.

Publication EP1889808 discloses a solution of a hoisting arm with an attachment device, which includes pivoted joints between the attachment device and the boom, forming a hanger, the axes of rotation of which are arranged as in a cardan joint. Here the hoses belonging to the pressure-medium line are led between the lugs of the upper pivoted joint of the hanger to the side of the hanger and then through the end of the lower pivoted joint to the connectors of the rotator. The connectors are now at the boom and thus also the work-machine side of the rotator. Here too the connections of the hoses are very close to the axis of rotation. They are therefore subject to stresses from various directions, which reduces their durability.

In publication EP2824059 too, the hoses belonging to the pressure-medium line are led from the end of the boom between both lugs of the pivoted joints of the hanger to the rotation device, in which there are connectors for the hoses at an angle to the axis of rotation of the rotation device. Here too, the joint is stressed by the movement of hose due to the closeness of the axis of rotation. In addition, here is also the problem that the stiffness of the hydraulic hoses resists the swinging movement more the more the pivoted joint has turned. Consequently, the free movement of the pivoted joint is restricted from she optimal extent of the rotation movement. In addition, as the hose bends more it becomes stressed and becomes brittle through being forced into a tight bend.

Thus, taken generally, in the solutions described above movement and usability are limited and impractical, the construction is liable to damage, and in addition, they are also complicated.

SUMMARY OF THE INVENTION

The present invention is intended to create an arrangement in the hoisting apparatus of a work machine, by which a freer swinging is permitted for the pivoted joint, and the durability of the pressure-medium lines and their joints is improved. The invention also relates to a hoisting apparatus and a work machine.

In the invention, the pressure-medium lines between the boom and the connectors of the rotation device are arranged to extend past the connectors of the rotation device in the longitudinal direction of the rotation device and to turn towards the connectors in order to form a hose loop. In addition, the pressure-medium lines are arranged to divide into the connectors arranged for them in the rotation device, which are arranged on both sides of the rotation device relative to the plane defined by the longitudinal direction of the boom and the longitudinal direction of the rotation device. Owing to the invention, the pressure-medium lines are routed from the boom to the rotation device in such a way that they and their connections to the rotation device permit the pivoted joints to swing freely in all directions within the limits of the axes of rotation of the pivots and do not prevent or interfere with the swinging. In addition, the pressure-medium lines and their connections withstand better the swinging of the tool and the rotation device.

According to one embodiment the pressure-medium lines are arranged in the longitudinal direction of the rotation device to run on the outside of the lugs on the rotation device side of the pivot of the pivoted joint and along the work machine side of the rotation device. The pressure-medium lines are thus located, in terms of damage, so that they are protected from external impacts, but at the same time the pressure-medium lines do not prevent or interfere with working with the aid of the tool attached to the boom. Thus, they are not in the way and do not move or swing too freely to catch on external objects.

According to one embodiment the pressure-medium lines are arranged to route from the boom to the rotation device in at least two layers preferably from inside the boom. Owing to this the boom can be relatively narrow, so that standard hangers can be used on it and the construction of the boom is lighter. In addition, this layering of the pressure-medium lines also improves the compactness of the routing. The pressure-medium lines then also support each other better. Other characteristic features and advantages of the invention may be appreciated from the following detailed description considered in conjunction with the accompanying drawings.

BRIEF DESCRIPTION OF THE DRAWINGS

In the following, the invention, which is not restricted to the embodiments described in the following, is described in greater detail with reference to the accompanying figures, in which.

DETAILED DESCRIPTION OF THE INVENTION

Figure 1:
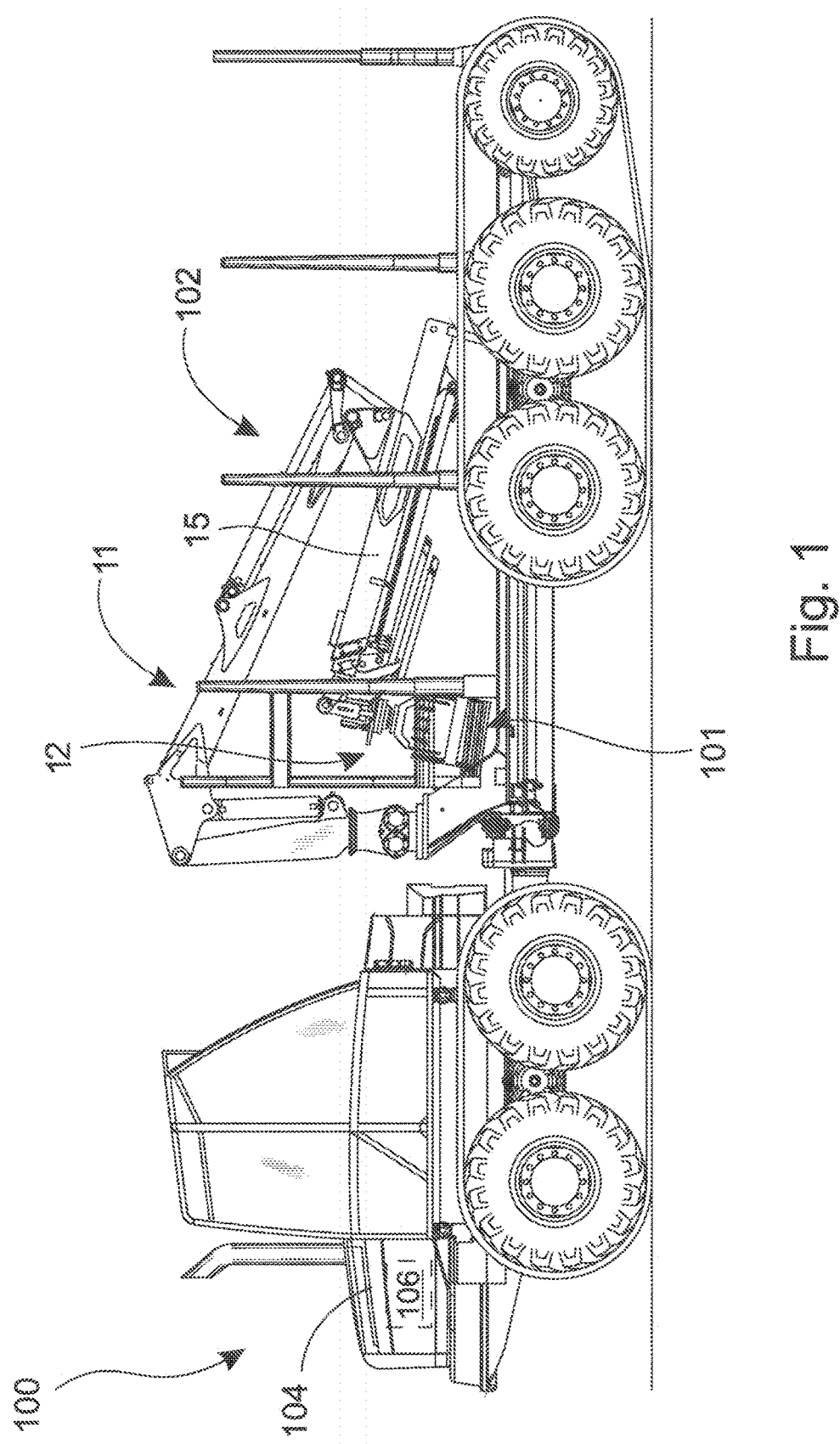
FIG. 1 shows an axonometric simplified schematic diagram of one example of a forest machine, in which the arrangement according to the invention can be applied.

FIG. 1 shows an axonometric simplified schematic diagram of one work machine 100, in which the arrangement according to the invention can be applied. The work machine now shown is a forest machine. In forest machines, there is generally a set of working booms 102, to the end 16 of the last boom in which, i.e. here boom 15, the rotation device 12 is attached in an articulated manner. The pivoting of the rotation device 12 to the boom 15 can be made, according to the prior art, by using two transverse rotating pivots that are at different directions to each other, more generally, by using a pivoted joint. It is also possible to talk of a hanger. The pivoted joints permit the rotation device 12 to hang vertically, irrespective of the attitude of the set of working booms 102.

A tool 101, of which a loader grab is now shown as an example, is attached to the rotation device 12, which is also generally referred to as a rotator. The tool 101 can be rotated with the aid of the rotation device 12 without restriction around the axis of rotation of the rotation device 12. According to the prior art, the flow of pressure medium required by the operating devices of the tool 101 can be brought through the set of working booms 102 with the aid of hoses, more generally, pressure-medium lines, from the forest machine's pressure-medium pump 106. The pressure-medium pump 106 is driven, for example, by the engine 104 of the forest machine, in order to create pressure.

The rotation device 12 permits the pressure-medium flow lines coming from the set of working booms 102 to be taken through the rotation device 12 to the operating devices of the tool 101. In the case of a harvester head, the operating devices can be, for example, the cylinder of the cutting device, the feed motors of the feed rollers, and the cylinders of the stripping claws. Correspondingly, in the case of a loader the operating devices are, for example, the cylinders of its grabs. The arrangement is intended to be used in connection with a forest machine in which the pressure medium is hydraulic oil, but the invention is also suitable for use with pneumatic pressure-medium flows. In this connection, it should be understood that, in place of a forest machine, the arrangement according to the invention is also suitable for use, for example, with excavators and other work machines equipped with sets of working booms, in which a tool, in which there are operating devices requiring a pressure medium, such as for example a bucket or grab, or something similar, is attached to the set of working booms.

Figure 2:
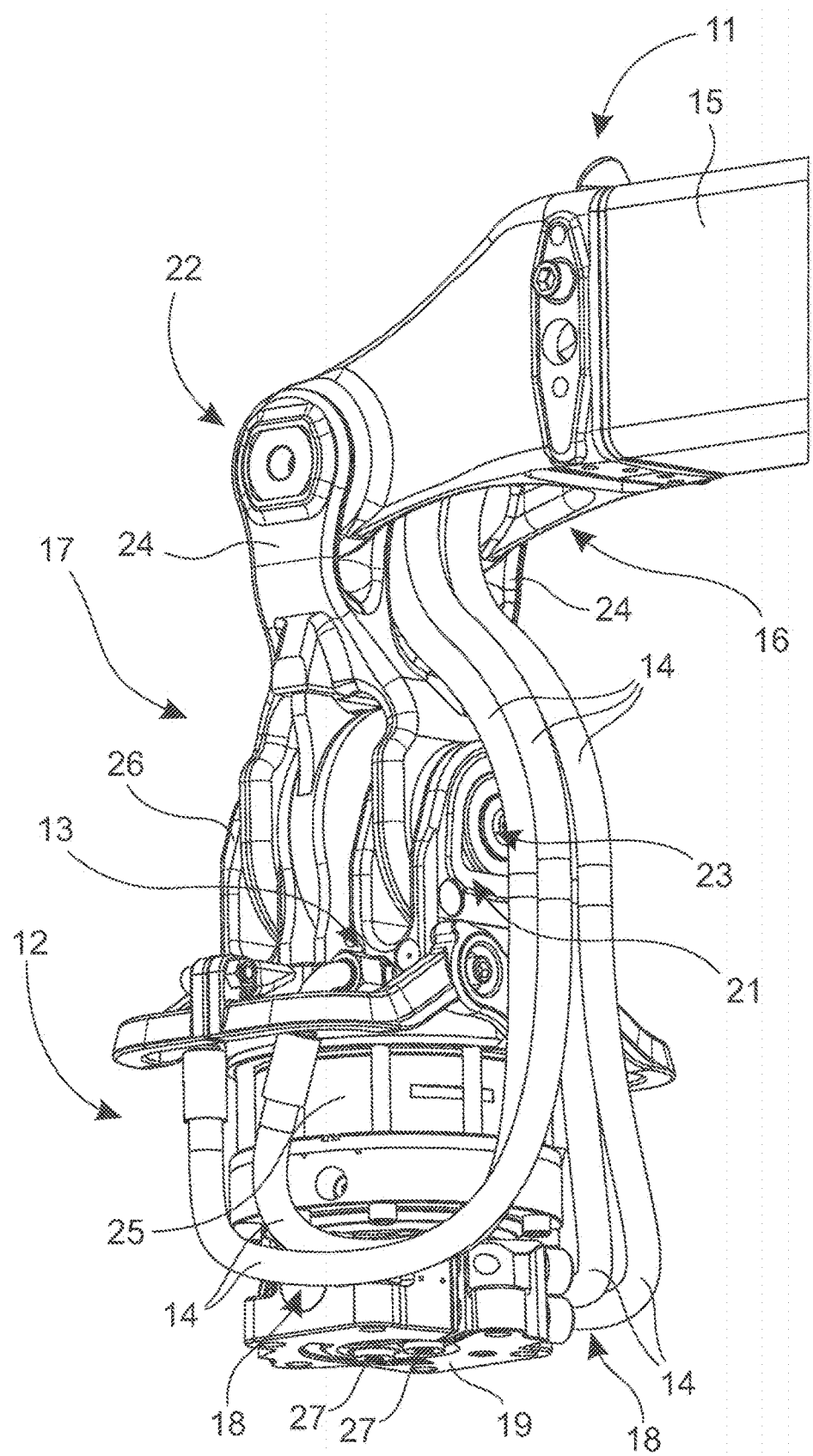
FIGS. 2-4 show one example of the arrangement, seen from different directions.
Figure 3:
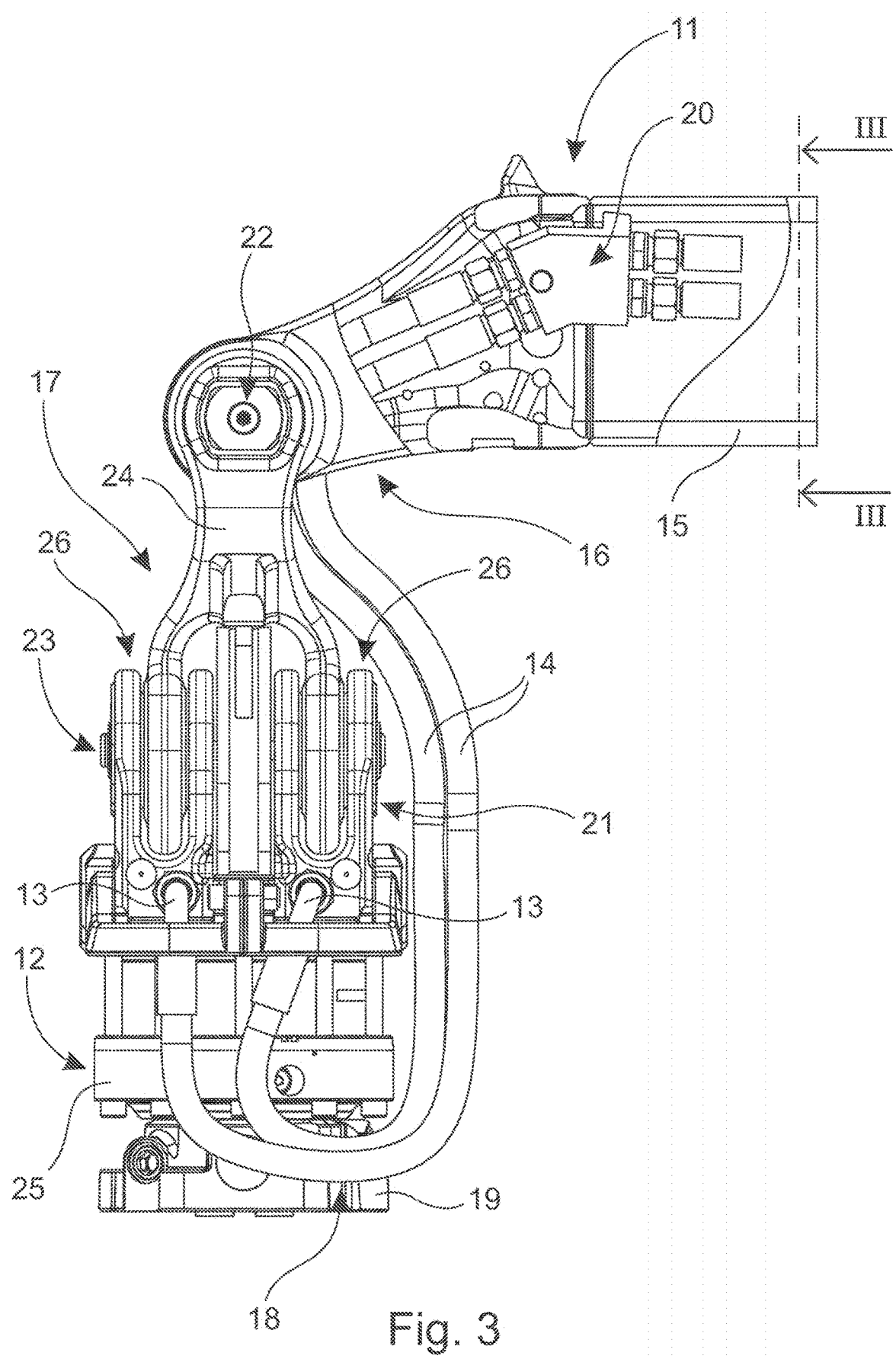
Figure 4:
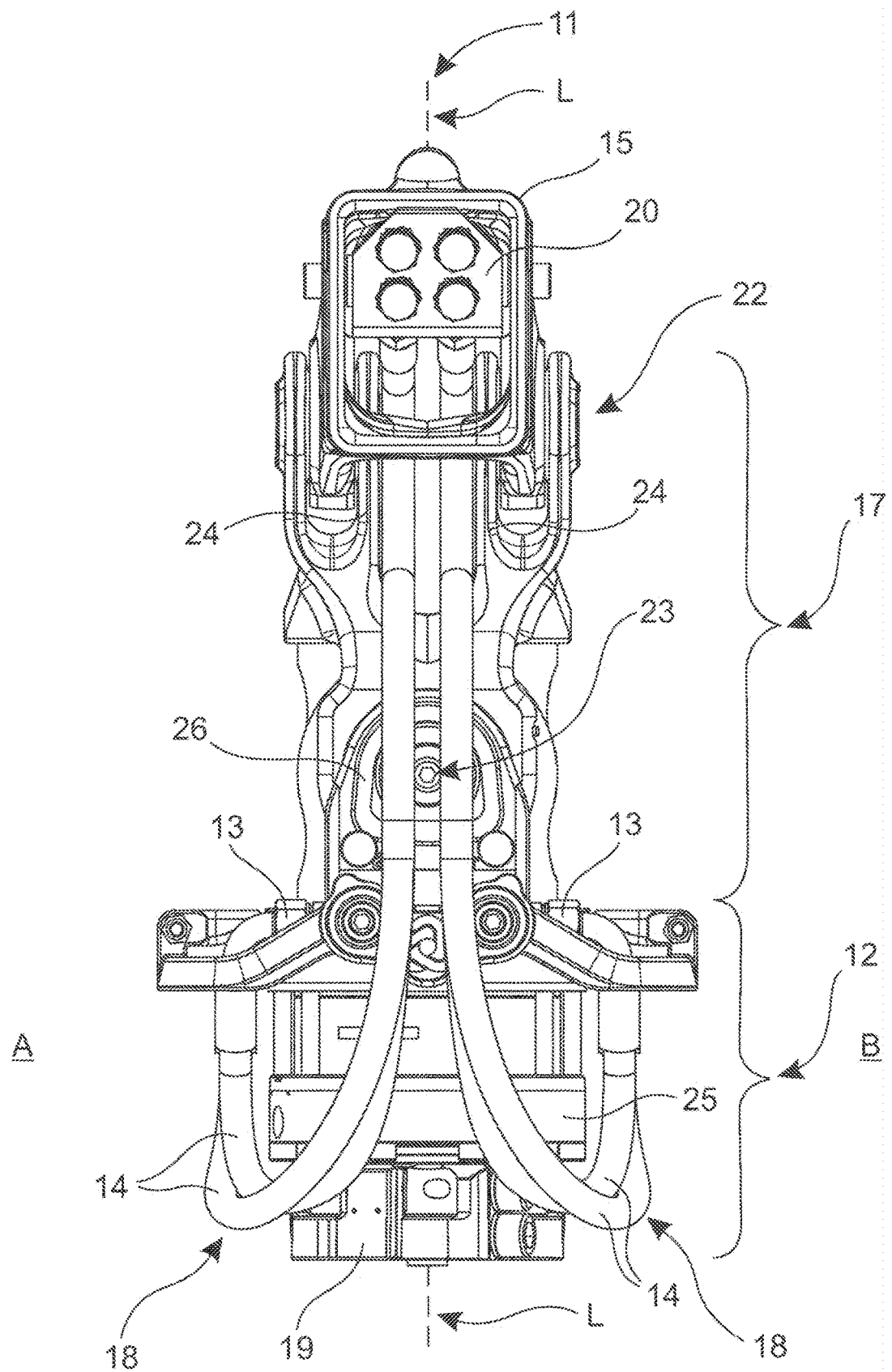

FIGS. 2-4 show one example of the arrangement in the hoisting apparatus 11 of a work machine 100, seen from different directions. In FIG. 2, the arrangement is seen at an angle from the side, in FIG. 3 seen from the side, and in FIG. 4 with the boom 15 in cross-section, seen from the direction of the work machine 100. The hoisting apparatus 11 includes, as basic components, a rotation device 12, a boom 15, and a pivoted joint 17 between them. The rotation device 12 can be, for example, one known as such from the prior art and equipped with connections 13 for connecting the pressure-medium lines 14 to the rotation device 12. The rotation device 12 includes, as basic components, a fixed part 25 attached to the pivoted joint 17, and a rotating part 19 fitted to it rotatably. On its under-surface, which comes against the tool 101 to be attached to it, the rotating part 19 can have connections 27 for a pressure medium. The pressure medium led through the structures of the rotation device 12 through the connections 27 is taken to the tool 101 and also led out of it. Between the pressure-medium lines 14 and the connections 13 there can be connectors at a chosen angle. In the embodiment, the connectors are at an angle of 90 degrees. The boom 15 can also be as such known of a kind from the prior art, for example, a tube beam structure and also telescopic. From the boom 15 the pressure-medium lines 14 are arranged to be led to the rotation device 12.

The pivoted joint 17 is arranged for suspending the rotation device 12, on the boom 15 of the hoist, being therefore situated between them. In the example according to the embodiment the pivoted joint 17 includes two consecutive pivots 22, 23 in the longitudinal direction of the rotation device 12 between the boom 15 and the rotation device 12. The axes of rotation of these pivots 22, 23 are arranged at right-angles, more generally, at an angle to each other and, in addition, the said axes of rotation are arranged at right-angles to the longitudinal direction of the rotation device 12. Thus, the pivoted joint 17 permits objects attached to it to swing freely. In addition, it also permits them to always hang directly downwards by gravity.

The pivots 22, 23 are formed, for example, in an as such known manner using lugs 24, 26. The lugs 24 with openings on the boom 15 side of the pivot 22 then connect to the joint openings arranged in the end of the boom 15. Correspondingly, the pivot 23 on the rotation device 12 side is formed by a lug joint 26.

In the arrangement, the pressure-medium lines 14 are arranged to route between the lugs 24 of the pivot 22 on the boom 15 side of the pivoted joint 17. The pivot 22 is then implemented using a cut pivot pin, i.e. it is only at the location of the lugs 24. In addition to this, the pressure-medium lines 14 are arranged to route past the connectors 13 fitted to the pressure-medium lines 14 of the rotation device 12 in the longitudinal direction L (FIG. 4) of the rotation device 12 and after that to turn towards the connectors 13 in order to form a hose loop 18. Thus, the routing of the pressure-medium lines 14 can be said to include, even more generally, a hose loop 18 arranged between the end 16 of the boom 15 and the connectors 13 of the rotation device 12.

In addition, in the arrangement the pressure-medium lines 14 are arranged, after the pivoted joint 17 to route and connect to the connectors 13 of the rotation device 12. The connectors 13 are fitted to both sides A, B of the rotation device 12, relative to the plane defined by the longitudinal direction of the boom 15 and the longitudinal direction of the rotation device 12. The connectors are also in that part 25 of the rotation device 12 that is attached in the pivoted joint 17. Thus, excess length is obtained for the pressure-medium lines 17 between the boom 15 and the connectors 13 of the rotation device 12. In this way, a freer movement is permitted for the pivoted joint 17. In addition, this improves the durability of the pressure-medium lines 17 and the connections in them. In addition, as the connectors 13 are on both sides A, B of the rotation device 12 relative to a plane defined by the longitudinal direction of the boom 15 and the longitudinal direction of the rotation device 12, the connectors 13 are well protected from impacts. Three points can, for example, be defined on the plane defined by the longitudinal direction of the boom 15 and the longitudinal direction of the rotation device 12. Of these, two points are located on the boom 15, for example, at its ends and the third point is on the axis defined by the longitudinal direction of the rotation device 12, which corresponds, for example, to its axis of rotation L (FIG. 4).

The pressure-medium lines 14 could be arranged to route to the rotation device 12 from inside the boom 15. The boom 15 can then be arranged with the internal routing of the pressure-medium lines 14 through the end 16 of the boom 15. The routing can be inside the boom 15 for most of the length of the boom 15. On the other hand, the routing could also be only partly inside the boom 15. The pressure-medium lines 14 can then be taken inside the boom 15 only near to its end 16, for example.

The pressure-medium lines 14 are arranged to route from the boom 15 to the rotation device 12 in at least two layers. They are then at least partly on top of each other. By layering the pressure-medium lines 14, the end 16 of the boom 15 remains an optimal narrow structure. Suitable standard-model hangers will then fit it. In addition, by layering more freedom of movement is obtained for the hoses, as the outermost need not bend so much in the area of the rotation device 12. Connection means 20 can then be fitted inside the boom 15, for example, a connector manifold or connectors from the pipe, in order to route the pressure-medium lines 14 out of the boom 15, for example, in parallel in at least two different layers, the pressure-medium lines 14 being thus at least partially on top of each other. These connection means 20 are visible in FIGS. 3 and 4. Here, being on top of each other can mean at least two clearly separate layers, or else also partly being on top of each other. In that case, the layers can be, for example, interlaced between each other.

The following describes in greater detail, as an embodiment, the routing of the pressure-medium lines 14 from the boom 15 to the rotation device 12, particularly with reference to FIGS. 2-4. Starting from the end 16 of the boom 15, the pressure-medium lines 14 are arranged to travel in the longitudinal direction L of the rotation device 12, preferably collected together, between the lugs 24 of the pivot 22 on the boom 15 side of the pivoted joint 17 and running externally round the end of the pivot 23 on the side of the rotation device 12. Thus, the pressure-medium lines 14 travel along the outer side of the pivoted joint 17. The pressure-medium lines 14 then travel past the end of the lower rotating pivot of the pivoted joint 17 and then continue along the outer side of the rotation device 12 towards the rotating part 19 of the rotation device 12.

After the pivoted Joint 17 and at the same time having also passed the connectors 13 of the rotation device 12, the pressure-medium lines 14 are arranged to divide from the preferably collected arrangement to the opposite sides A, B of the rotation device 12, relative to a plane defined by the longitudinal direction of the boom 15 and the longitudinal direction of the rotation device 12. The longitudinal direction L of the rotation device 12 is at the same time also the direction of the axis of rotation of the rotating part 19 of the rotation device 12.

In addition, the pressure-medium lines 14 are arranged to travel in parallel in at least two different layers for at least part of the distance between the location of the pivoted joint 17 and even more generally between the end 16 of the boom 15 and the rotation device 12. The superimposed and parallel array can be maintained by binding the pressure-medium lines 14 together over this distance using a spiral shield (not shown). In the case of the embodiment of FIGS. 2-4, the pressure-medium lines 14 are arranged, in the longitudinal direction of the rotation device 12, to travel along the rotation-device 12 side 21 of the work machine 100, outside the lugs 26 of the pivot 23 on the rotation-device 12 side of the pivoted joint 17. By travelling on the work-machine's 100 side 21, they are well protected under the boom from impacts, which can be caused, for example, by falling objects (for example, when loading). Being outside the lugs 26, the pressure-medium lines 14 are subject to less stress caused by the movement of the pivoted joint 17. In addition, they are at the same time also in the field of vision of the driver of the work machine, making it possible to predict better, and thus avoid, impacts on them (for example, branches).

Further, the pressure-medium lines 14 are arranged to travel at the location of the pivoted joint 17 mainly symmetrically relative to the plane defined by the longitudinal direction of the boom 15 and the longitudinal direction of the rotation device 12. This clarifies, for example, the manufacture and also the installation of the pressure-medium lines 14. The length of the pressure medium lines 14 to be connected to connectors 13 located on opposite side A, B of the rotation device 12 and at corresponding points to each other can correspond mainly to each other, and in that way simplify their manufacture. In addition, thanks to the symmetricity, the possible effect on the movement of the pivoted joint 17 caused by the stress of the pressure-medium lines 14 and especially the hose loop 18 is balanced better by the symmetrical placing.

In the case according to the embodiment, the routing of the pressure-medium lines 14 is arranged to extend at most to the rotating part 19 of the rotation device 12 in the longitudinal direction of the rotation device 12. Preferably, the routing of the pressure-medium lines 14 is arranged to travel in the longitudinal direction L of the rotation device 12 through the rotating part 19 of the rotation device 12.

Thus, in the case of the embodiment according to FIGS. 2-4, in which the longitudinal axis of the connectors 13 of the pressure-medium lines 14 of the rotation device 12 is oriented relative to the longitudinal direction of the rotation device 12 to the side of the hose loop 18, i.e. in the direction of the opposite side relative to the pivoted joint 17, the routing of the pressure-medium lines 14 on the work machine 100 side 21 of the pivoted joint 17 is arranged by a hose loop 18 to be turned to mainly the opposite direction in order to connect to the connectors 13 of the rotation device 12. The connectors 13 of the rotation device 12 are then oriented in the direction of the tool 101 to be fitted to it, i.e. downwards (FIG. 1). However, the orientation of the connectors 13 can vary. They can be rotated, for example, relative to the horizontal axis they define.

The change of direction of the pressure-medium lines 14, i.e. the angle of turning of the hose loop 18, can vary greatly. In the case of the embodiment shown, it is roughly about 180 degrees, i.e. the pressure-medium lines 14 turn in the direction opposite to their arrival direction, before connecting to the connectors 13 of the rotation device 12. At a minimum, the change in direction can be in the order of 90 degrees and at a maximum even greater than 180 degrees. If the pressure-medium lines 14 turn sharply immediately at the junction of the pivoted joint 17 and the rotation device 12, the change in direction can be closer to 90 degrees.

For its part, the change in direction also depends on the orientation of the connectors 13 of the rotation device 12. If, for example, the connector 13 is oriented away from the boom 15, the change in direction of the pipeline, i.e. the hose loop 18 may be even greater than the said 180 degrees. In addition, it is also possible to speak of an open hose loop. In that case, the pressure-medium lines 14 do not form a closed loop as they travel. The internal diameter of the pressure-medium lines 14 can be, for example, 6-20 mm, preferably 9-16 mm, in order to achieve an optimal volume flow. The pressure-medium lines 14 are flexible hoses.

Figure 5:
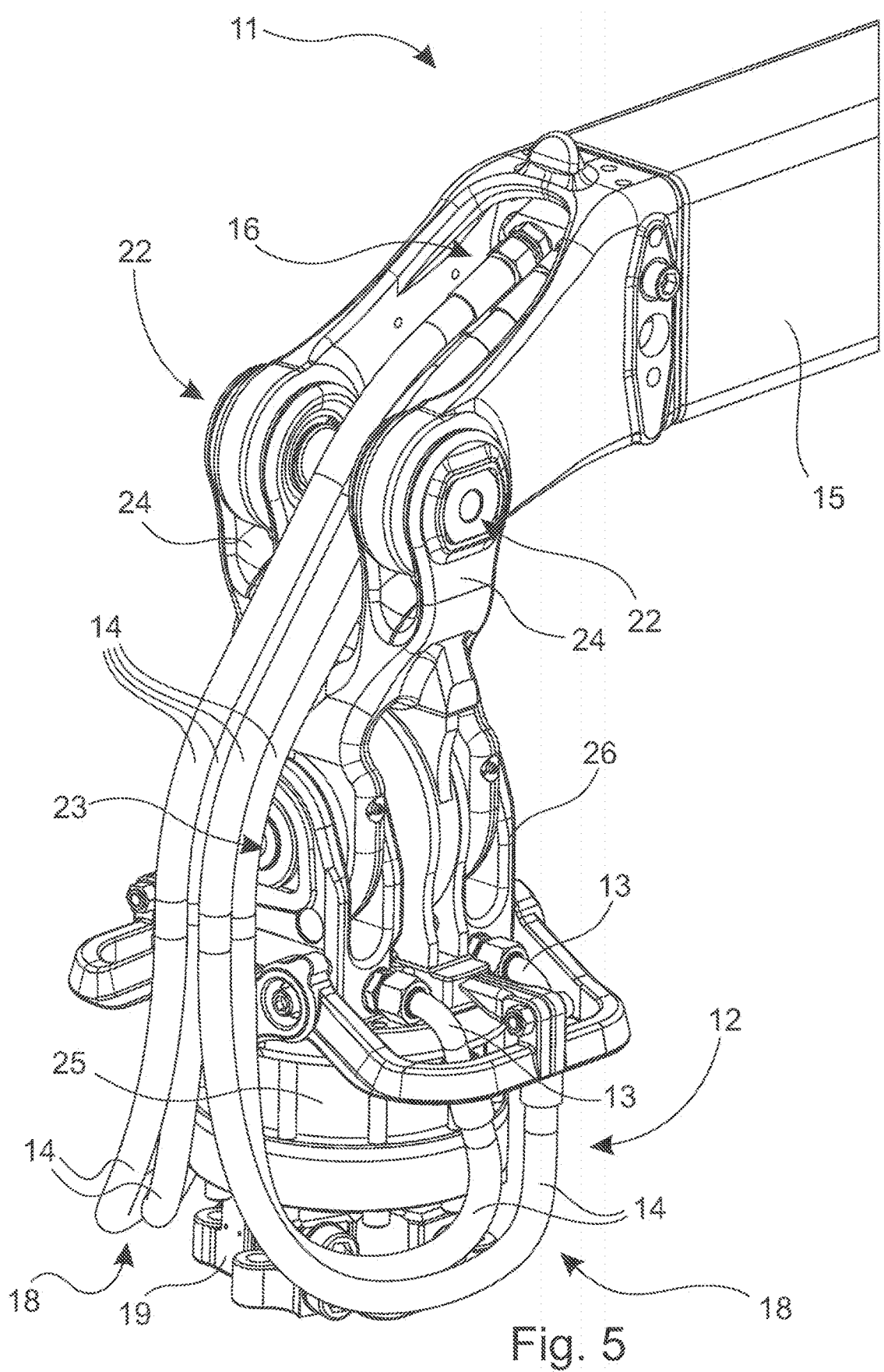
FIGS. 5 and 6 show a second example of the arrangement.
Figure 6:
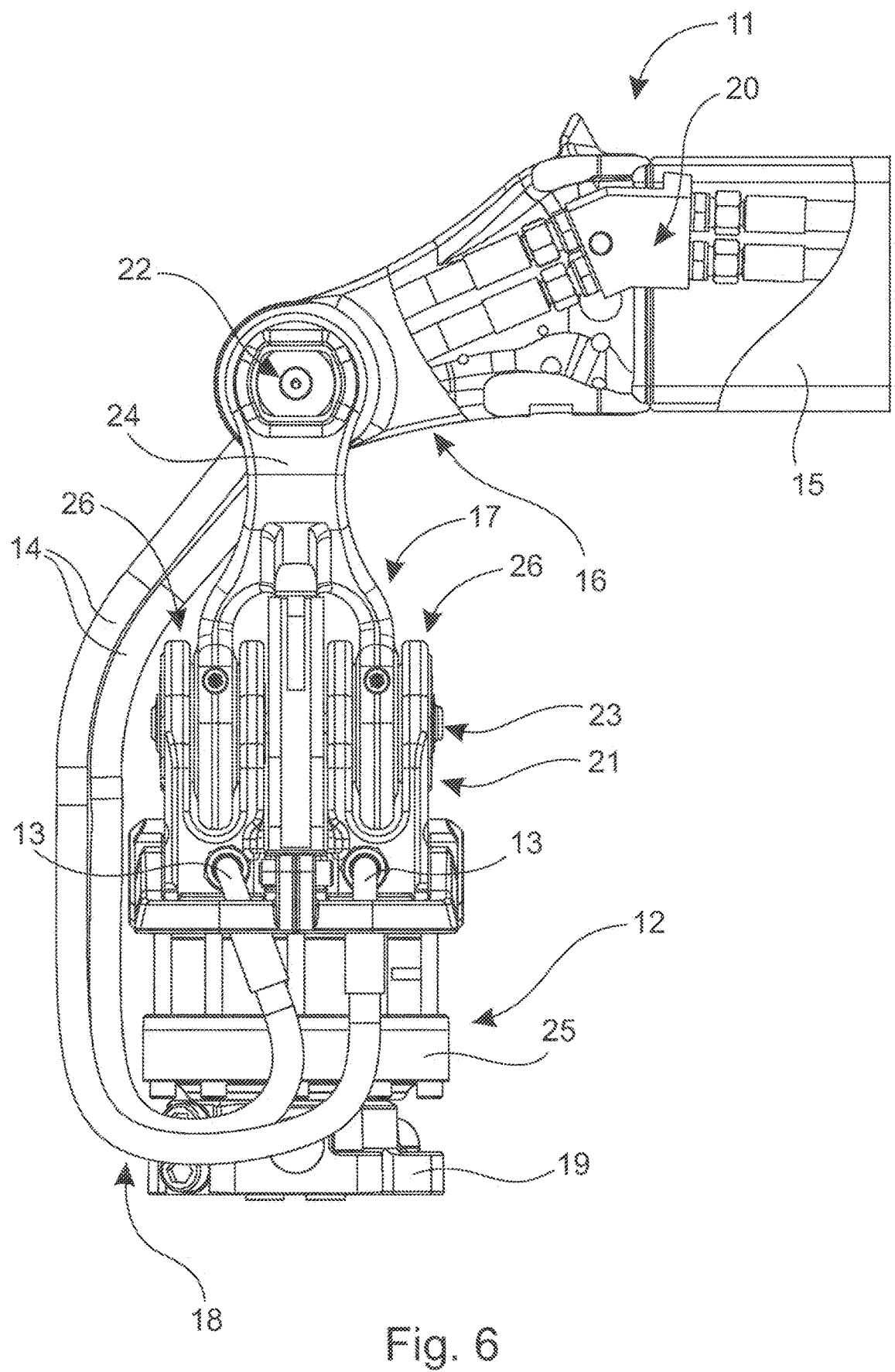

FIGS. 5 and 6 show yet another embodiment of the arrangement according to the invention. The same reference numbers as above are used for components that correspond functionally to each other. Here the routing of the pressure-medium lines 14 differs from that described previously. Now, the routing travel from the end 16 of the boom 15 through the lugs 24 of the pivoted joint 17 to the opposite side of the pivoted joint 17 relative to the previous embodiment, being the opposite side of the pivoted joint 17 relative to the work machine 100. From there the routing travels in a similar manner along the outer edge of the pivoted joint 17 in the longitudinal direction L of the rotation device 12 past the plane defined by the connectors 13 and makes a hose loop 18 in the area of the rotation device 12 dividing in a similar manner to both sides A, B of the rotation device 12, as happened in the previous embodiment too.

In addition to the arrangement, the invention also relates to the hoisting apparatus 11, such as, for example, a crane or loader, of a work machine, preferably a forest machine, which includes the arrangement according to the invention. Further in addition, the invention also relates to a work machine 100, preferably a forest machine, which include a hoisting apparatus 11 according to the invention.

By means of the routing according to the invention of the pressure-medium lines 14, freedom of movement is obtained for the hoses, which permits an optimal amount of movement for the pivoted joints, without, however, restricting movement and without stressing the pressure-medium lines 14, formed by the hoses, and their connections, for example, to the rotation device 12. Owing to the invention, the operation of the hose runs over the two pivots 22, 23 works better and, in addition, the hoses are routed as closely as possible to the pivot points.

In should be understood, that the above description and the related figures are intended only to illustrate the present invention. The Invention is thus not restricted to only the embodiments described above or defined in the Claims, instead, many different variations and modifications of the invention, which are possible within the scope of the inventive idea defined in the accompanying Claims, will be obvious to one versed in the art.

The invention claimed is:

1. An arrangement in a hoisting apparatus of a work machine, the hoisting apparatus comprising:
   a boom with an end;
   pressure-medium lines;
   a rotation device comprising:
      a fixed part;
      a rotating part fitted to the fixed part rotatably in a vertical rotation axis defined by a longitudinal direction of the rotation device and comprising an interface on an under-surface of the rotating part for a tool to be attached to the rotation device; and
      connectors arranged on both sides of the fixed part of the rotation device relative to a plane defined in a longitudinal direction of the boom and the longitudinal direction of the rotation device for connecting the pressure-medium lines to the rotation device; and
   a pivoted joint arranged for suspending the rotation device on the boom, the pivoted joint including two consecutive pivots in a longitudinal direction of the rotation device, the two consecutive pivots having respective rotational axes arranged at right-angles to each other, one of the two pivots being on the boom side of the pivoted joint and including spaced apart lugs;
   whereinh the pressure-medium lines are routed from the end of the boom to the rotation device between the lugs, past the connectors of the fixed part of the rotation device in the longitudinal direction of the rotation device and to turn towards the connectors to form a hose loop, and from the loop to the connectors for the connecting of the pressure-medium lines to the rotation device.

2. The arrangement according to claim 1, wherein the pressure-medium lines are arranged to route from the boom to the rotation device in at least two layers.

3. The arrangement according to claim 2, wherein the pressure-medium lines are arranged at the pivoted joint to travel in parallel in at least two separate layers.

4. The arrangement according to claim 3, comprising connection means fitted inside the boom to route the pressure-medium lines out from the boom in parallel in at least two separate layers.

5. The arrangement according to claim 2, wherein the pressure-medium lines are arranged to route from the boom to the rotation device in at least two layers from inside the boom.

6. The arrangement according to claim 1, wherein in a longitudinal direction of the rotation device, the pressure-medium lines are arranged
   to travel between the lugs of the boom side pivot of the pivoted joint and to run around an outside of the end of the rotation device side of the pivoted joint; and
   to divide after the pivoted joint to both sides of the rotation device relative to the plane defined by the longitudinal direction of the boom and the longitudinal direction of the rotation device.

7. The arrangement according to claim 1, wherein in the longitudinal direction of the rotation device, the pressure-medium lines are arranged to travel outside the lugs of the one pivot on the boom side of the pivoted joint and along a work-machine side of the rotation device.

8. The arrangement according to claim 1, wherein an internal diameter of the pressure-medium lines is 6-20 mm.

9. The arrangement according to claim 1, wherein a longitudinal axis of the pressure-medium lines' connectors in the rotation device is oriented on a side of the hose loop relative to the longitudinal direction of the rotation devices.

10. The arrangement according to claim 1, wherein the pressure-medium lines are arranged to travel, at the pivoted joint symmetrically relative to the plane defined by the longitudinal direction of the boom and the longitudinal direction of the rotation device.

11. The arrangement according to claim 1, wherein the routing of the pressure-medium lines is arranged to extend at most, in the longitudinal direction of the rotation device, to the rotating part of the rotation device.

12. A hoisting apparatus of a work machine, comprising the arrangement according to claim 1.

13. A work machine, the work machine comprising a hoisting apparatus according to claim 12.

14. The work machine of claim 13, wherein the work machine comprises as a forest machine.

15. The hoisting apparatus of claim 12, wherein the hoisting apparatus is one of a crane of and a loader.

16. The hoisting apparatus of claim 12, wherein the work machine comprises a forest machine.

17. The arrangement according to claim 1, wherein an internal diameter of the pressure-medium lines is 9-16 mm.

* * * * *